United States Patent [19]

Lindbloom et al.

[11] Patent Number: 4,674,058

[45] Date of Patent: Jun. 16, 1987

[54] METHOD AND APPARATUS FOR FLEXIGON REPRESENTATION OF A TWO DIMENSIONAL FIGURE

[75] Inventors: Bruce J. Lindbloom; Peter Mathews, both of Minneapolis; David S. Yam, Eagan, all of Minn.

[73] Assignee: Dicomed Corporation, Minneapolis, Minn.

[21] Appl. No.: 328,108

[22] Filed: Dec. 7, 1981

[51] Int. Cl.[4] ............ G06F 15/626

[52] U.S. Cl. ............ 364/518

[58] Field of Search ............ 364/200, 900, 518, 521, 364/523; 340/728, 748; 354/12

[56] References Cited

U.S. PATENT DOCUMENTS

| | | | |
|---|---|---|---|
| 3,450,865 | 6/1969 | Peras | 235/151 |
| 3,659,283 | 4/1972 | Ophir | 340/324 A |
| 3,789,200 | 1/1974 | Childress et al. | 235/151 |
| 3,809,868 | 5/1974 | Villalobos et al. | 235/151 |
| 3,828,319 | 8/1974 | Owen et al. | 364/200 |
| 4,070,710 | 1/1978 | Sukonick et al. | 364/900 |
| 4,095,216 | 6/1978 | Spicer | 340/324 AD |
| 4,115,863 | 9/1978 | Brown | 364/521 |
| 4,195,338 | 3/1980 | Freeman | 364/521 |
| 4,197,590 | 4/1980 | Sukonick et al. | 364/900 |
| 4,254,468 | 3/1981 | Craig | 364/521 |
| 4,298,945 | 11/1981 | Kyte et al. | 364/521 |
| 4,330,834 | 5/1982 | Murphy | 364/521 |
| 4,373,194 | 2/1983 | Demke et al. | 364/521 |
| 4,390,780 | 6/1983 | Wu et al. | 364/521 |

OTHER PUBLICATIONS

"Rational B. Splines for Curve and Surface Representation".

*Tex and Metafont, New Directions in Typesetting,* by Donald E. Knuth (1979) (Book).

Text/File Management Systems by Autologic Incorporated (Brochure).

APS-5 Digital CRT Phototypesetter by Autologic by Autologic Incorporated (Brochure).

APS-MICRO 5 Digital CTR Typesetter by Autologic by Autologic Incorporated (Brochure).

The Seybold Report, vol. 9, No. 8, dated Jan. 7, 1980 by Autologic Incorporated.

Autologic Input Command Language Manual dated Jan. 1979 by Autologic Incorporated.

Product Announcement by Chromatics.

*Primary Examiner*—Gareth D. Shaw

*Assistant Examiner*—John G. Mills

*Attorney, Agent, or Firm*—Merchant, Gould, Smith Edell, Welter & Schmidt

[57] ABSTRACT

A graphic arts method and apparatus for representation via display media of arbitrary two dimensional figures are disclosed. The method and apparatus of the present invention convert raw figure data into a reduced data set which defines a two dimensional arbitrary shape, herein referred to an a bezier figure, whose edges are defined by second order parametric curves such that the edges of the bezier figure closely approximate those of the figure represented by the raw data. The bezier figure data is converted for presentation on a display medium of an image which closely approximates that of the figure.

19 Claims, 28 Drawing Figures

FIG. 21
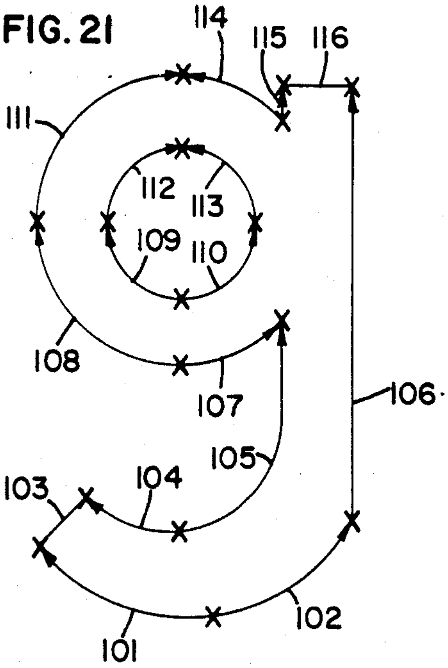
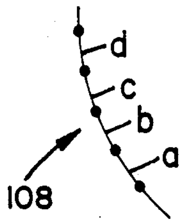
FIG. 22
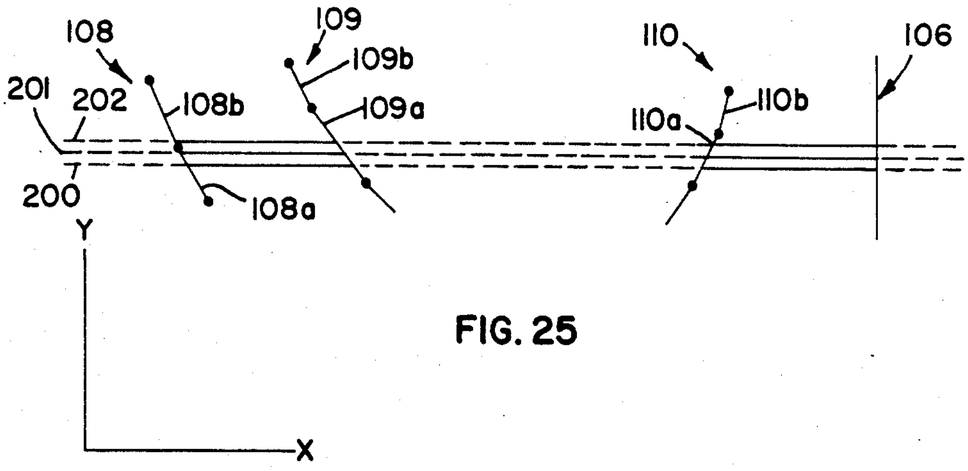
FIG. 25

METHOD AND APPARATUS FOR FLEXIGON REPRESENTATION OF A TWO DIMENSIONAL FIGURE

TECHNICAL FIELD

The present invention relates generally to the field of computer aided graphic arts. More specifically the invention relates to a method and apparatus for representation of and recreation of two dimensional arbitrary shapes.

BACKGROUND OF THE INVENTION

Computer aided or generated graphics systems are used in a wide range of applications, including information display, creation of images for photographic and printing applications, and computer aided design and manufacturing of a wide variety of products and components. Creation of two dimensional figures via a display media is currently accomplished in the computer aided graphic arts by storing large amounts of digitized figure coordinate data. Current systems of this type are subject to certain problems in terms of the size of memory requirred to store a particular figure, computation time for reconstructing the figure from the stored data, and flexibility of application in terms of ability to handle arbitrary shapes, as opposed to a limited number of predetermined shapes, and flexibility in editing and manipulating these shapes.

In these prior art systems, curve fitting or smoothing of figure data, if performed, is accomplished as a post processing step and not in real time while the figure is being created. Due to the large number of coordinates required to represent a particular figure, temporary storage of a large amount of data is necessary requiring a large amount of storage media and a significant amount of extra time to process the stored data.

After the digitized figure data is stored, algorithms must be used to convert the data to an acceptable format for presentation via a display medium or viewing device. The algorithms utilized for this purpose depend heavily upon the data base used to define the figures. Many display formats such as raster and run encoded, do not allow for efficient linear transformation of the digitized figure data. Polygonal approximation formats do not guarantee smooth edges when subjected to a transformation. Furthermore, transformation time is comparatively long due to the fact that all of the figure data must be individually transformed.

These limitations of prior art computer graphic systems are especially apparent in the field of phototypesetting, where high speed operation and the ability to faithfully reproduce a wide variety of character fonts and special characters are of great practical importance. Prior systems have been limited in their performance in these criteria.

The present invention solves these and many other problems present in the computer aided graphic arts.

SUMMARY OF THE INVENTION

The present invention relates to a method and apparatus for representation of a two dimensional form on display media. This is accomplished by use of a two dimensional arbitrary shape whose edges or boundary lines are described by second order parametric curves and straight line segments, herein defined as a Bezier figure. The Bezier figure has smooth and well defined border lines when displayed at any given resolution and its shape closely approximates that of the form it represents.

In one embodiment of the present invention, parametric curves are fitted to figure coordinate data received from an input device such as a digitizing tablet. The curve fitting is accomplished in real time, not as a post processing step, thereby eliminating the need for large amounts of figure data storage. Curve fitting of the data received assures image quality regardless of the data transformation required for display and regardless of the viewing resolution of the display medium. The figure data can be fitted both by curve sections and straight sections. The joining of the various sections can be continuous or discontinuous.

Another feature of the present invention is a selectable "fit threshold" which allows adjustment of the degree of fit in order to achieve a desired balance between maximization of fit and minimization of data storage. Furthermore, sections may be interactively inserted or deleted, changed from curved into straight sections and visa-versa, smoothed at the intersection of two sections, etc.

Another feature of the present invention is the ability to provide for viewing purposes only as much detail as the viewing device can utilize.

According to another feature of the invention, a method and apparatus are provided for high speed reconstruction and display of characters from Bezier figure data sets for the characters previously converted and stored as forward-difference data for a plurality of small straight line segments that closely approximate the character shape. High speed presentation on a scanned display medium is accomplished by repetitive calculation and updating of scanned line intersections with the straight line segments.

These and various other advantages and features of novelty which characterize the invention are pointed out with particularity in the claims annexed hereto and forming a part hereof. However, for a better understanding of the invention, itsadvantages, and objects obtained its use, reference should be had to the drawings which form a further part hereof, and to the accompanying descriptive matter, in which there is illustrated and described a preferred embodiment of the invention.

BRIEF DESCRIPTION OF THE DRAWINGS

In the drawings, in which like reference numerals and letters indicate corresponding parts throughout the several views.

FIG. 21 is a diagramatic respresentation of the letter "g" made up of a plurality of curves for use in the forward-difference method of reconstruction of the Figure;

FIG. 22 shows a portion of one curve of FIG. 21 subdivided into a plurality of straight line segments;

FIG. 25 is a diagram illustrating operation of the system of FIGS. 23 and 24 in recreating a portion of a character.

DETAILED DESCRIPTION OF THE INVENTION

For purposes of this application, a Bezier figure is defined as a two dimensional arbitrary shape whose edges are defined by a set of second order parametric equations. The present invention provides a computer based system for providing a graphical representation of a two dimensional arbitrary form. This is accomplished by the creation and presentation via display media of a Bezier figure whose shape closely approximates that of the form represented.

Figure 1:
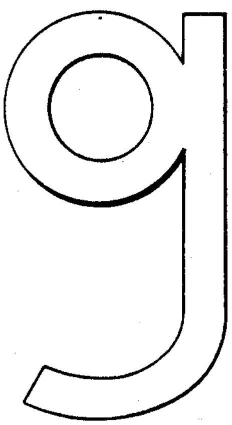
FIG. 1 is an illustration of the letter "g"
Figure 2:
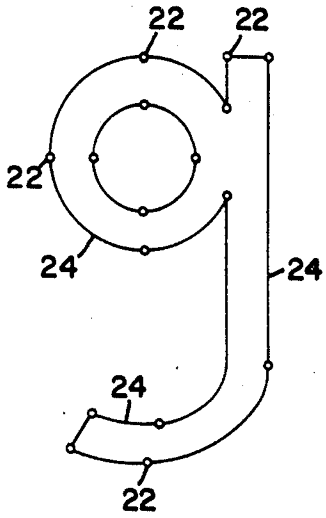
FIG. 2 is a Bezier figure representation of the letter "g"

Illustrated in FIG. 1 is an arbitrary form which in this instance is the letter "g". Shown in FIG. 2 is a Bezier figure representation of the letter "g". Note that the boundary of the Begier figure is defined by a series of vartices or node points 22 interconnected by a series of curves and straight lines 24. In this particular example there are sixteen curves 24 and sixteen node points 22. Thus the character "g" is represented by a plurality of quadratic parametric curves 24 interconnecting a number of nodes 22.

Figure 3:
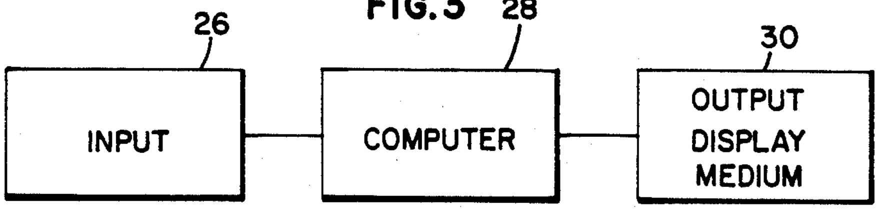
FIG. 3 is a diagramatic figure of a computer base graphic system.

As illustrated in FIG. 3, figure data is normally obtained from an input device 26 such as a digitizing tablet. The figure data in turn is processed by a computer 28 which in one embodiment of the present invention is a PDP 11/34 or PDP 11/23. The resulting process data is then output to a display medium 30 for visual presentation of a Bezier figure which represents the form for which the data was received and processed. Examples of the types of display media which might be utilized are raster scan frame buffer displays, film recorders, plotters, etc.

Figure 4:
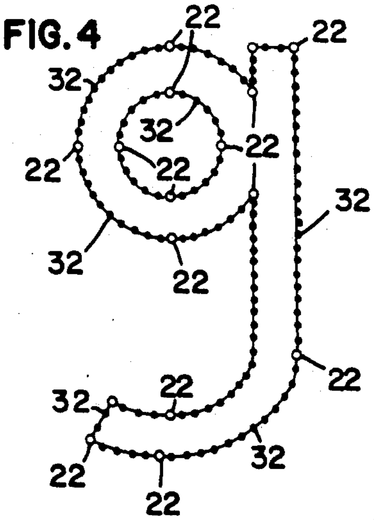
FIG. 4 is a representation of the letter "g" input data received from an input device.

In one embodiment of the present invention, figure data is obtained from a digitizing tablet. The raw figure data represents coordinate positions 32 on the boundary of the figure as illustrated in FIG. 4 where the figure "g" data is illustrated. As the figure coordinate data 32 is obtained, the slope between two adjacent points is calculated. Those coordinates which are determined to be X maxima or minima, Y maxima or minima, inflection points, and start and end points are saved and designated as node points 22. Note that in order to determine when there is an inflection point, the slope data (S1, S2, S3) for three consecutive pairs of points 32 is saved. If either of the following conditions are met then there is an inflection point:

$$S1>S2<S3 \qquad (1)$$

$$S1<S2>S3 \qquad (2)$$

Figure 5:
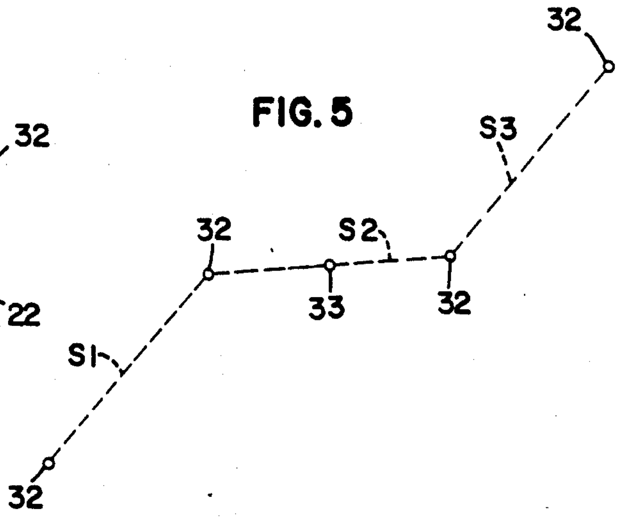
FIG. 5 is a representation of three segments S1, S2, S3.

When an inflection is detected, the midpoint 33 of the middle segment having slope S2 is used as the actual inflection point and is saved as the node point. Illustrated in FIG. 5 is an example of the first condition.

Figure 6:
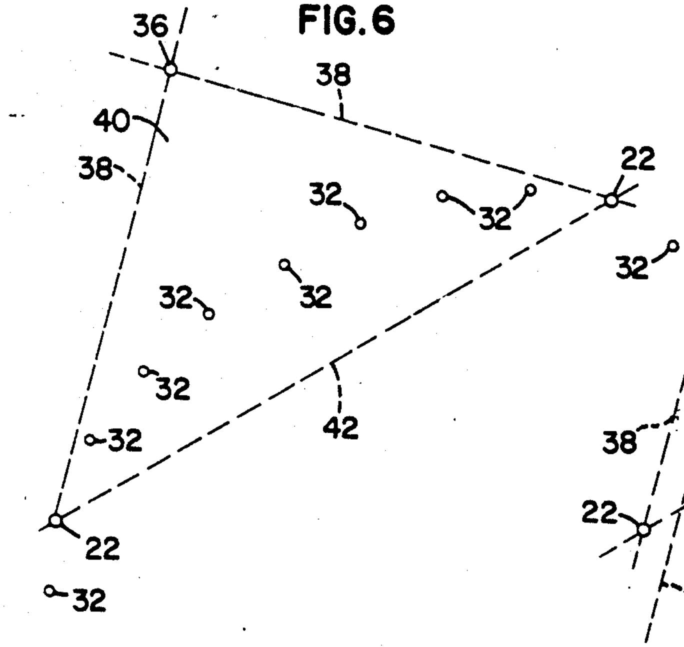
FIG. 6 is a representation of two adjacent nodes and their associated control points.

In FIG. 6, a group of data points 32 two of which are node points 22 is shown. At any given time during the processing of figure data, data points 32 lying on a span between adjacent nodes 22 are saved as is one data point 32 on either side of this span. When two adjacent nodes 22 are detected, a slope control point 36 is determined by the intersection of two control lines or frames 38. Control point 36 thus lies at the vertex of a triangle 40 defined by control lines 38 connecting nodes 22 to control point 36 and a base line 42 interconnecting nodes 22.

Figure 7:
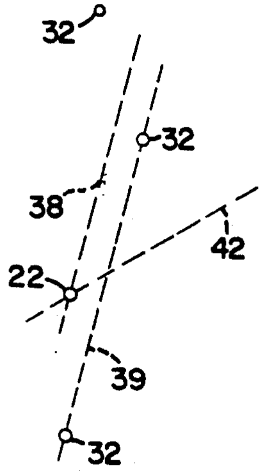
FIG. 7 is a representation of control line orientation.
Figure 8:
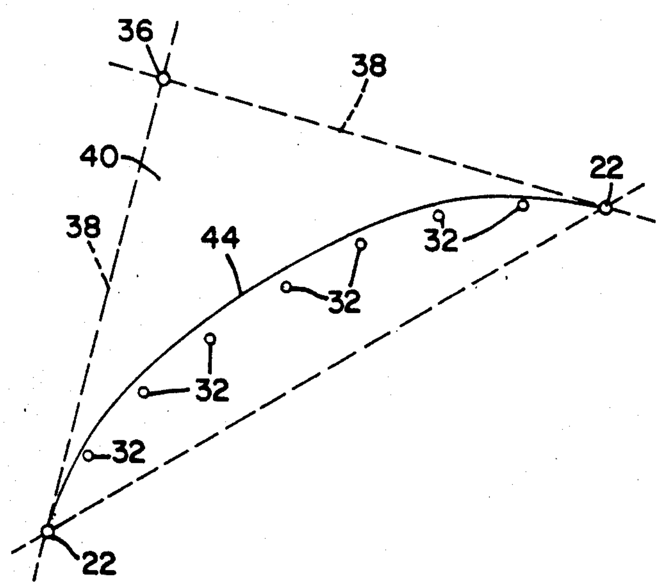
FIG. 8 is a representation of a Bezier curve between two adjacent nodes.

As shown in FIG. 7, each control line 38 has the same slope as and is parallel to the line 39 interconnecting data points 32 on either side of node 22 through which line 38 extends. The two nodes 22 and control point 36 may then be used to define a Bezier curve 44 as illustrated in FIG. 8 which approximates that of the figure boundary between adjacent nodes 22 as defined by data points 32. Control point 36 and nodes 22 are then stored in memory and the data points 32 are discarded except for the data point 32 immediately preceding the last node 22 detected.

Subsequent data coordinate positions 32 are then saved until a subsequent node 22 is detected at which point the processing on this set of data is performed. This processing continues for each pair of nodes 22 detected until the entire boundary of the Bezier figure has been defined and/or terminated by the operator.

Each Bezier curve 44 is tangent to the control frames 38 at nodes 22. The Bezier curve between adjacent nodes 22 is defined by the following parametric equations:

$$X=P_0+P_1Z+P_2Z^2$$

$$Y=Q_0+Q_1Z+Q_2Z^2$$

Where: Z varies from 0 to 1 and where $P_0$, $P_1$, $P_2$, $Q_0$, $Q_1$, $Q_2$ are defined as follows:

$$P_0=X(i)$$

$$P_1=2[Xc(i)-X(i)]$$

$$P_2=X(i)-2Xc(i)+X(i+1)$$

$$Q_0=Y(i)$$

$$Q_1 = 2[Yc(i) - Y(i)]$$

$$Q_2 = Y(i) - 2Yc(i) + Y(i+1)$$

Xc(i), Yc(i) are control point coordinates between adjacent nodes whose coordinates are X(i), Y(i) and X(i+1), Y(i+1).

Figure 9:
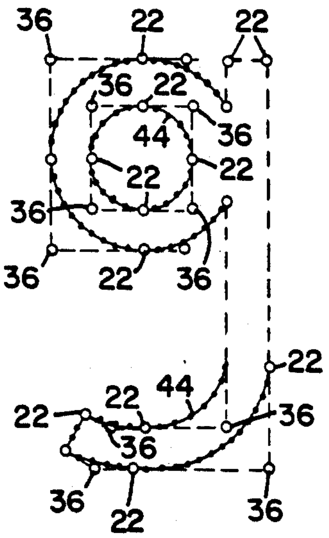
FIG. 9 is a diagramatic representation of control points and nodes defining a letter "g"

As illustrated in FIG. 9, node points 22 and control points 36 which are stored in memory may then be used to display the two dimensional form, in this case the letter "g", via a visual presentation medium. Note that the dots illustrate the outline of the resulting Bezier curves 44 which would be plotted to represent the letter "g".

The above described curve fitting processing is performed in real time as the figure data is received from the input device. In another embodiment of the present invention, selective figure data is obtained and saved in memory for later processing as desired.

The final data set which is saved in memory for representation of a given Bezier figures includes all the detected nodes 22 and their associated control points 36. This requires much less memory than the storage of all figure data points 32 and minimizes delays due to the processing of such a large data set. Furthermore, the data set requiring transformation processing for display purposes is reduced and easier to operate on. In addition, a smooth figure boundary can be presented at any resolution at the display media.

In one embodiment of the present invention, when a span between nodes 22 is completed, the resulting Bezier curve 44 is compared with the corresponding figure data 32. If the deviation is greater than a specified threshold value, a node 22 will be added and the Bezier curve will be divided into two Bezier curves. The resulting Bezier curves are similarly tested in a recursive fashion until the threshold value is achieved.

Figure 10:
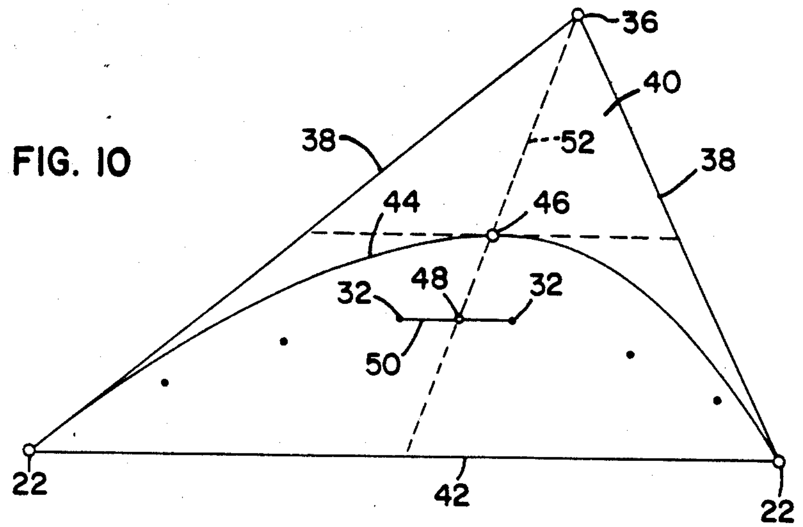
FIG. 10 is a diagramatic representation of Bezier curve deviation from actual input data.

To reduce the computational burden of generating the actual Bezier curve for the fitting test which is performed in real time, the properties of the Bezier polygon (triangle) are used to estimate the maximum deviation from the actual data. As indicated in FIG. 10, the point 46 of maximum displacement of Bezier curve 44 from base 42 of triangle 40 may be quickly computed from the triangle geometry. The point 48 of maximum figure data displacement from base 42 of triangle 40 is easily computed by checking for the intersection of a line 50 with a line 52 which extends from control point 36 to a point at the midsection of base 42 of triangle 40. Line 50 is defined by the two data points 32 closest to line 52 and on either side thereof. The distance between points 46 and 48 is then computed and compared with the predetermined threshold to see if a subdivision is necessary.

Figure 11:
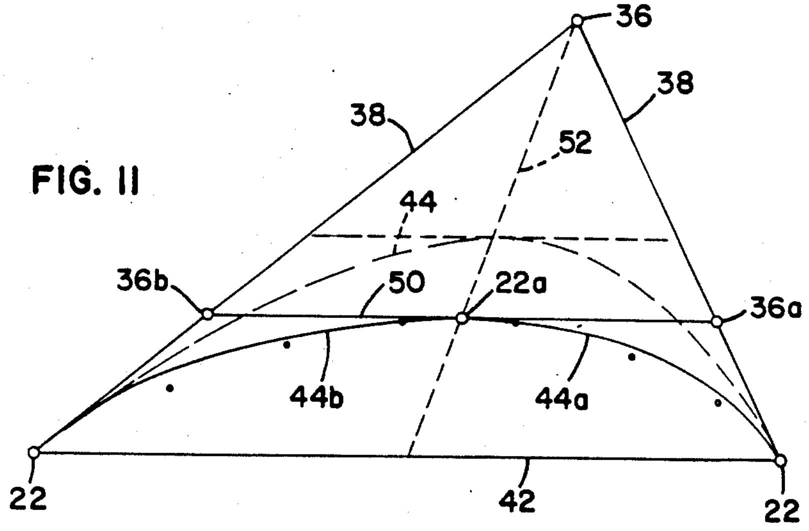
FIG. 11 is a diagramatic representation of the Bezier curve splitting process.

If a subdivision is required, a node 22*a* is inserted at point 46 and then control points 36*a*, *b* on either side are defined at the intersection point of line 50 with sides 38 of triangle 40 as illustrated in FIG. 11. The Bezier curve math may then be performed in each of the two new Bezier curves 44*a*, *b* and compared with the predetermined threshold. Further Bezier curve splitting may be carried out in a recursive fashion until the threshold is met and the desired accuracy of fit is derived between Bezier curves 44 and data points 32.

Once the Bezier figure data is stored in memory, the Bezier figure data must be converted for display purposes. One way to display a Bezier figure is to convert the Bezier figure data into polygon data defining a polygon or closed plane figure bounded by straight lines which is representative of the Bezier figure. The polygon data includes the coordinates of the polygon vertices. The coordinates of the polygon vertices are derived by substituting evenly incremented values of Z between zero and one into the Bezier curve parametric equations of each Bezier curve defining the edges of the Bezier figure represented.

The resultant polygon must have a sufficient number of vertices such that the polygon edges will appear smooth on the display device. However, the number of vertices needed per Bezier curve 44 between adjacent nodes 22 for a smooth appearance should be maintained at a minimum to reduce the computational time for generating the vertex list, clipping the resultant polygon, and scanline conversion of the polygon. The minimum number of vertices required to assure a smooth appearance will depend on the resolution of the viewing device, the length of the span between nodes, the radius of curvature at each point along the span, etc.

Figure 12:
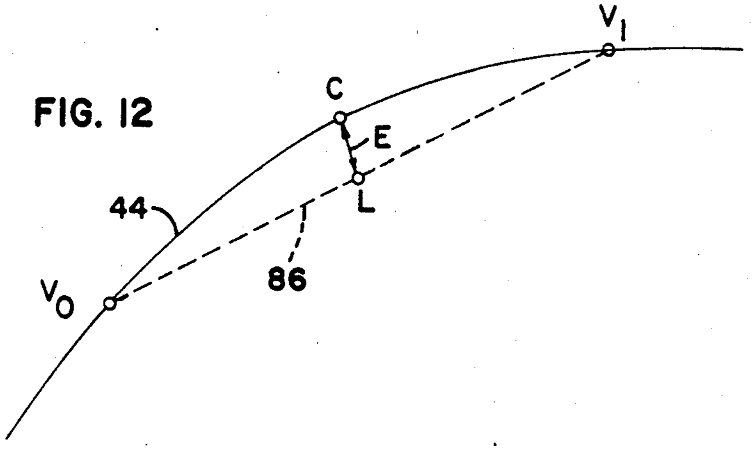
FIG. 12 is a diagramatic representation of the distance computation between a portion of a Bezier curve and a corresponding polygon straight line segment approximation.

In one embodiment of the present invention as illustrated in FIG. 12, the number of vertices or straight line segments required for a given Bezier curve is determined by measuring the distance E between a point C lying on the Bezier curve 44 between two adjacent vertices $V_0$, $V_1$ and a point L lying on a polygon line segment 86 between vertices $V_0$, $V_1$. The X, Y coordinates for C and L, (Cx, Cy) and (Lx, Ly) are defined by the parametric equations defining the Bezier curve wherein the points C and L represent an incremental value of Z which is only one half that between vertices $V_0$, $V_1$:

$$Cx = \frac{P_1 Z_I}{2} + \frac{P_2 Z_I^2}{4}$$

$$Cy = \frac{Q_1 Z_I}{2} + \frac{Q_2 Z_I^2}{4}$$

$$Lx = \frac{P_1 Z_I}{2} + \frac{P_2 Z_I^2}{2}$$

$$Ly = \frac{Q_1 Z_I}{2} + \frac{Q_2 Z_I^2}{2}$$

$Z_I$ = Increment in parameter Z (Note in the above, it is assumed without any loss of generality that $P_0 = Q_0 = 0$, and that the segment is the first of the sequence of segments.)

The difference in X coordinates is:

$$\frac{P_2 Z_I^2}{4}$$

The difference in Y coordinates is:

$$\frac{Q_2 Z_I^2}{4}$$

Distance E between points C and L may thus be represented as:

$$E = \sqrt{\frac{P_2^2 Z_I^4}{16} + \frac{Q_2^2 Z_I^4}{16}}$$

The above equation may be rewritten as follows:

$$E^2 = \frac{Z_l^4 (P_2^2 + Q_2^2)}{16}$$

$$Z_l^4 = \frac{16E_2^2}{(P_2^2 + Q_2^2)}$$

$$Z_l^2 = \frac{4E}{\sqrt{(P_2^2 + Q_2^2)}}$$

$$Z_l = 2\sqrt{E}\,(P_2^2 + Q_2^2)^{-\frac{1}{4}}$$

or $$1/Z_l = \frac{(P_2^2 + Q_2^2)^{\frac{1}{4}}}{2\sqrt{E}}$$

By selecting a value for distance E, the number of straight line segments required for a given Bezier curve may be determined as discussed above. Typically, a distance E is one half of a raster step. When distance $E=\frac{1}{2}$, the number of straight line segments or steps is:

$$\frac{(P_2^2 + Q_2^2)^{\frac{1}{4}}}{\sqrt{2}} \text{ or } \sqrt{\frac{\sqrt{P_2^2 + Q_2^2}}{2}}$$

In an effort to speed up the computation process, a magnitude computation method illustrated below can be utilized to approximate the above equation so as to avoid multiplications, double precision arithmetic and iterations.

$$\text{Number of segments or } 1/Z_l \approx \frac{MAG}{2} + 1$$

Where:

MAG=larger of MAX or ($\frac{7}{8}$ MAX+$\frac{1}{2}$ MIN)

MAX=larger of $P_2$ or $Q_2$

MIN=smaller of $P_2$ or $Q_2$

Newton Raphson's method may then be used to derive the number of straight line segment or steps. The above discussed magnitude computation method has a maximum error of approximately 3%. The computation is invariant with respect to rotation.

Figure 13:
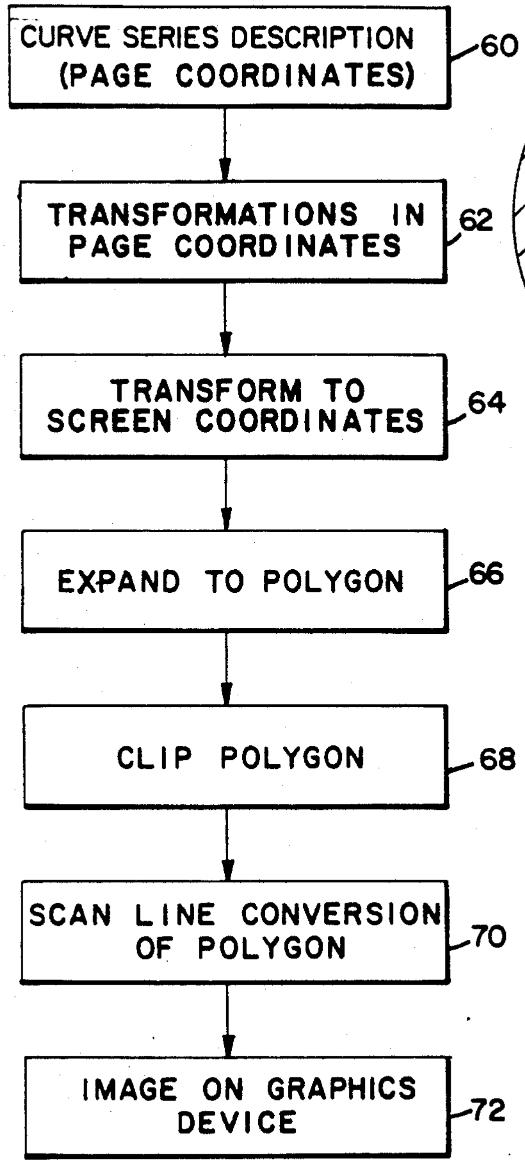
FIG. 13 is a diagramatic representation of a processing sequence of the present invention.
Figure 14:
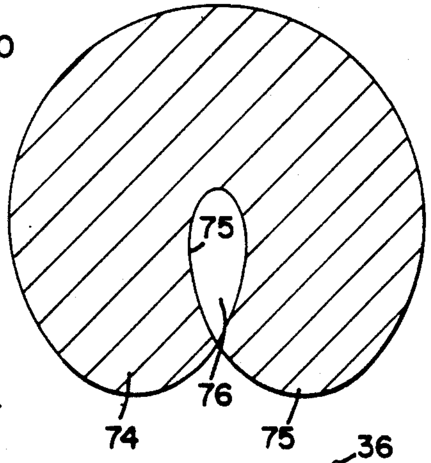
FIG. 14 is a Bezier figure whose edges overlap.

Illustrated in FIG. 13 is an example of the processing sequence from Bezier figure node 22 and control point 36 determination through imaging of a figure on a graphic device. As shown by step 60, the Bezier figure description data must first be determined as previously discussed. Next at step 62, transformations are performed such as scaling, translation, perspectives, rotation, etc. using well known transformation routines. It is important to note that significant reduction in processing is achieved by performing the transformations with Bezier figure data which is a minimum data set before conversion of the data set to a polygon data set which is an expanded data set. Next as illustrated in step 64 a transformation to screen coordinates is performed. This may be accomplished by any one of several well known conversion techniques. In step 66, the Bezier figure data is converted and expanded to polygon data as described above. Once the polygon data has been established, at step 68 well known clipping algorithms can be used to clip portions of the polygon data which will not be displayed on the viewing device. Finally, at step 70, a scanline conversion of the polygon data is performed in which the area corresponding to the Bezier figure is determined. This is necessitated by the fact that the outer edge 75 or boundary of the Bezier figure may intersect and overlap. This is illustrated in the example shown in FIG. 14 where area 74 is part of Bezier figure 20 while area 76 is not. At step 72 the figure representation is next displayed on the graphic device.

In the above described embodiment of the present invention, the clipping process comes after the polygon expansion process. If only a small portion of the image is being viewed on the graphics device (i.e. when focusing in on an enlarged portion), the polygon expansion step will produce a very large number of vertices because the Bezier figure data is very large in screen coordinates. This large number of vertices is usually generated in step 66 only to be clipped off in step 68. To alleviate some of this problem, in one embodiment of the present invention, a step is introduced between steps 64 and 66 which eliminates entire Bezier curves before the conversion to a polygon.

Figure 15A:
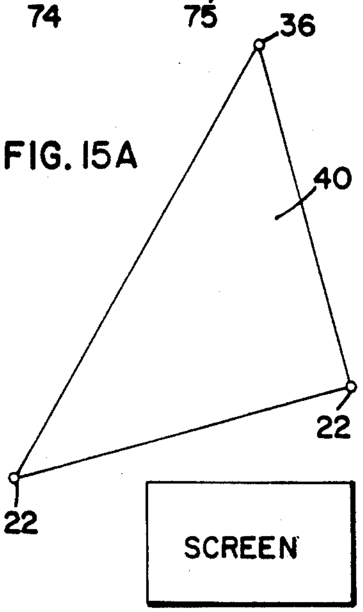
FIGS. 15A, B are representations of the two possible conditions when all edges of a Bezier figure are found to lie off screen.
Figure 15B:
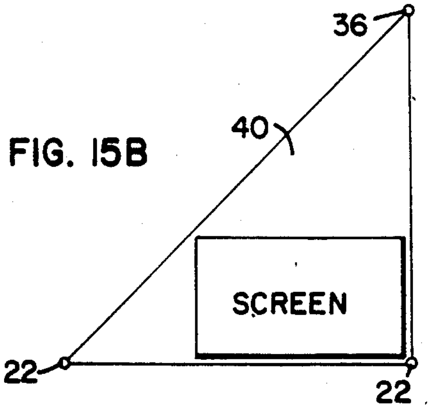

The data for each Bezier curve of span includes two nodes 22 and one control point 36 which form a triangle 40. If any of the edges of the Bezier triangle are found to be either partially or entirely on-screen, the corresponding Bezier span is processed normally by expanding it to a set of polygon vertices. If all the edges are found to lie entirely off screen, either the Bezier triangle 40 is off screen as illustrated in FIG. 15A or the screen is looking at a portion inside the Bezier triangle as illustrated in FIG. 15A. An inclusion test of any visible screen coordinate against the triangle distinguishes between the above two cases. This may be accomplished by selecting a horizontal ray from the screen point and extending it to either the right or left and counting the number of intersections made with the triangle edges. An even number implies the first case and an odd number the second case.

The first case is processed by reducing the entire span to a single segment, namely the triangle baseline connecting the two nodes. The second case is processed normally by polygon expansion.

Figure 16A:
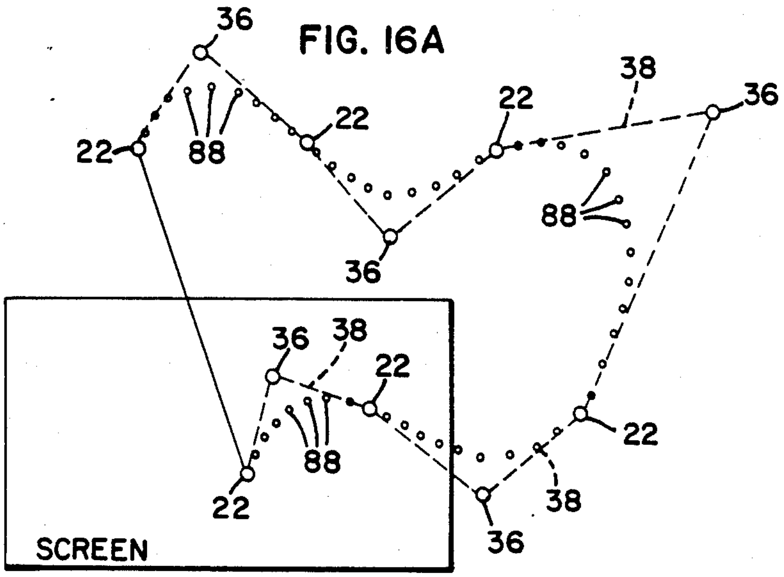
FIGS. 16A, B are representations of the data points saved for clipping.
Figure 16B:
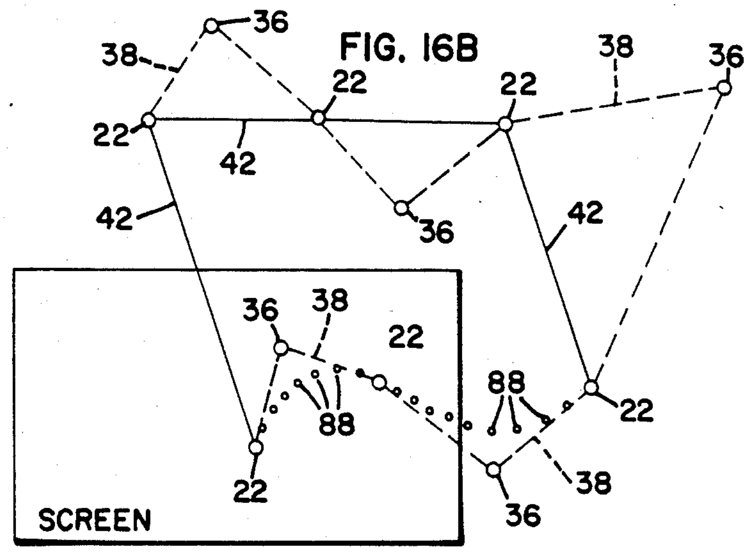

Illustrated in FIGS. 16A, B is an example of how the above described feature of the present invention results in a reduced data base which is operated on by the clipper algorithms. Control frames 38 are shown along with control points 36 and nodes 22 of the Bezier figure. In FIG. 16A wherein the clipping process occurs after the expansion to polygon data, all the coordinates of the polygon vertices 88, represented by dots, including nodes 22, must be clipped. However, in FIG. 16B wherein clipping occurs prior to expansion, only the vertices 88 along the Bezier curves partially or entirely on screen and the nodes 22 along the Bezier triangle baseline segments 42 of the Bezier curves off screen are clipped. The processing time required to generate the later data base is much less because entire spans are clipped eliminating the need to generate individual points.

One embodiment of the present invention also utilizes a culling algorithm in the figure identification of Bezier figures. The algorithm is a boxing technique followed by a polygon figure identification of the box. If the box passes the test, the polygon is passed onto the rigorous figure identification on the actual Bezier figure. If the box fails the test, the Bezier figure is discarded and the next figure is considered. The boxing filtering algorithm may speed the figure identification process by a factor of 100 or more allowing figure identifications to the performed very quickly even with large numbers of Bezier figures in the image.

And yet another embodiment of the present invention there is included a feature which allows insertion, deletion, and modification of Bezier curves 44 whereby the overall shape of a Bezier figure can be edited. This feature provides for the smoothing of the junction between two adjacent Bezier curves 44. As illustrated in FIGS. 17 through 20, four types of junctions are curve-curve, curve-line, line-curve, and line-line.

Figure 17:
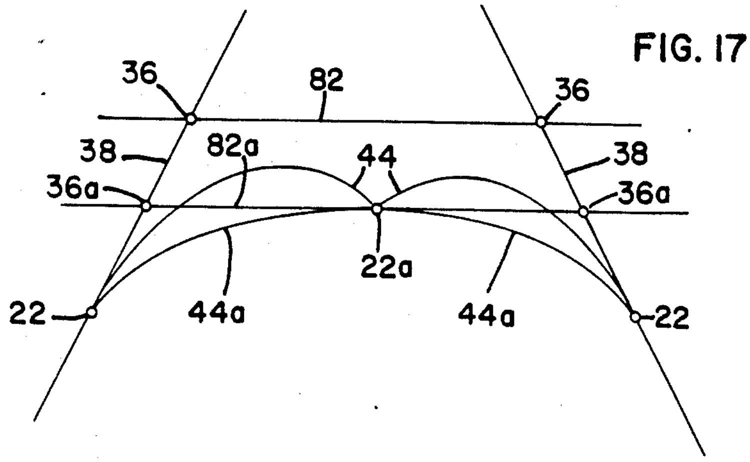
FIGS. 17 through 20 are examples of Bezier figure editing.
Figure 18:
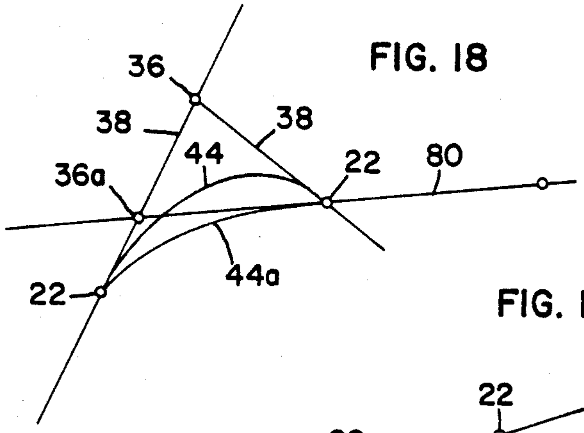
Figure 19:
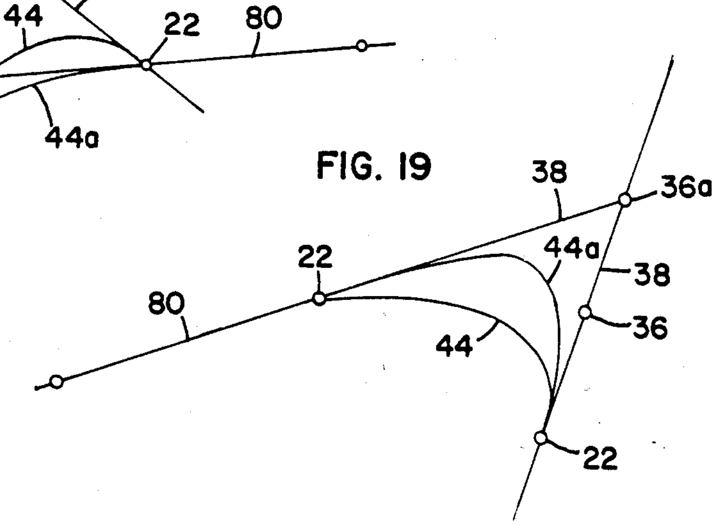
Figure 20:
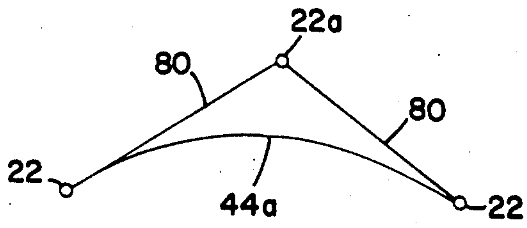

As illustrated in FIG. 17, two new Bezier curves 44a are defined by moving control points 36 in along control frame 38 to define new control points 36a. New control points 36a are at the intersection of a line 82a which passes through node 22a and control frame 38 and is parallel to line 82 between control points 36. New curves 44a are thus the resulting Bezier curves defined by each set of nodes 22 and 22a and their associated control point 36a. In FIG. 18, a new curve 44a is defined by moving control point 36 in along control frame 38 to define a new control point 36a at the intersection of line 80 and control frame 38. The same process is performed in FIG. 19 where there is a line 80 and Bezier curve 44 junction. In FIG. 20, node 22a which is the junction of two lines 80 is used as the new control point for a new curve 44a. The above described feature thus enables modification of a Bezier figure so as to more accurately represent the form desired.

The technique described above of reconstructing and displaying Bezier figures by converting Bezier curves for the figure into display polygons is appropriate for many applications, but there are other applications in which an alternate approach to Bezier figure reconstruction and display is preferable. Once such application in the field of graphic arts is in high speed phototypesetting, wherein a number of characters representing, for example, a page of text are to be drawn under computer control on the face of a cathode ray tube to form a photographic image that can subsequently be used in printing. In such phototypesetting systems, high speed operation is important for efficient economic utilization of the apparatus, so that a large amount of text material can be phototypeset in a small amount of time. Another important consideration for computer phototypesetting systems is the optical quality of the characters generated. It is advantageous in such systems to provide the capability for reproducing a number of different type font styles, and special characters when special needs arise. A preferred system would also provide capability for scaling and rotating the orientation of the characters according to particular needs.

Unfortunately, prior computer phototypesetting systems have been lacking in one or more of these areas. Many have been characterized by an extremely small number of characters that can be used, poor fidelity to the shape of the intended character, leading to an inferior final printed product, slow speed of operation, and complications that limit scaling and rotating characters.

However, through the use of the Bezier figure creation, reconstruction and manipulation techniques of our invention, it is possible to bring significant improvement to the art of phototypesetting. Individual letters or other special characters can be represented as data sets for Bezier figures. Because of the minimum data set and compact storage requirements for the Bezier figure approach, a great number of characters can be stored in a memory of convenient size, and can be called upon for high speed generation of characters. By simply changing data sets, a great number of different fonts or type styles or special characters can be made available.

For high speed generation of the Bezier figure shapes in a phototypesetting operation, it has been found desirable to use a different data set for the Bezier figure from the Bezier curve data set in the previous example. Specifically, the method of forward-differences is applied to the individual curves of the Bezier figure. The forward-difference data sets can be created by transformation of the Bezier curve data sets in the previous example, or can be generated by other means, including independent generation. The forward-difference equation approach is illustrated further with reference to FIGS. 21 and 22.

FIG. 21 is an enlarged scale diagram of a Bezier figure, in this case, in the form of a lower case letter "g", but it will be understood that any arbitrary shape can be accommodated. Bezier figure 100 of FIG. 21 is made up of a number of separate joined portions, referred to herein as "curves". The curves can take any one of the following forms: an arc, a sloped line, a vertical line, or an implicit horizontal line. In FIG. 21, the Bezier figure 100 is made up of curves 101 through 116. Of these, all are arcs, except for curve 103, which is a slope line, curves 106 and 115 which are vertical lines, and curve 116 which is an implicit horizontal line. Each of curves 101 through 115 is a monotonically increasing function in the Y direction: no multiple values of X for a given Y value are permitted for a given curve. Where it is necessary for a portion of the Bezier figure figure to bend back on itself in X so as to provide multiple X values for given Y, for example at the bottom of the figure, curves 101 and 102, it is necessary to subdivide into two or more curves. Each curve starts from a minimum Y position, indicated by the X marks in Bezier figure 100, and proceeds to a Y maximum value, indicated by the arrowhead symbol for each curve. Start points for curves are thus required at each low point for new curve segment. Also, if a curve portion of the figure encounters an inflection point where the sense of curvature reverses, a start point would be required (none are shown in FIG. 21.)

In the forward-difference data method for storing and reconstructing Bezier figures, a plurality of short straight segments are generated for each curve which together approximate the desired shape. For example, FIG. 22 shows a portion of curve 108 of FIG. 21, at an enlarged scale. The curve actually consists of a plurality of straight line segments, a–d being shown as represented examples. The number of segments into which a given curve would be subdivided is chosen to give the desired degree of fidelity in reproduction of the Bezier figure curve shape. Any degree of accuracy can be obtained by subdividing into a greater number of segments, which potentially lengthens plot time for small character sizes. In practice, a number of segments are chosen to give close enough approximation to a curve so that the segmated shape is not apparent to the eye of the observer and the final print form.

A Bezier figure is thus represented as a plurality of joined curves, monotonic in Y, with a certain data set defining each curve. The data for each curve consists of $$\begin{bmatrix} X_0 & Y_0 \\ DX_0 & DY_0 \\ D^2X_0 & D^2Y_0 \end{bmatrix} = \begin{bmatrix} 0 & 0 & 1 \\ E^2 & E & 0 \\ 2E^2 & 0 & 0 \end{bmatrix} \begin{bmatrix} P_2 & Q_2 \\ P_1 & Q_1 \\ P_0 & Q_0 \end{bmatrix}$$

Where $P_0$, $P_1$, $P_2$, $Q_0$, $Q_1$, $Q_2$, are coefficients of the parametric equations previously defined, E equals the spacing between successive parameter values, and 1/E equals the number of evaluation points.

E is chosen for each curve to give satisfactory fidelity to the desired shape, but subject to computation format constraints. $X_0$, $Y_0$ are starting coordinates for a curve; $DX_0$, $DY_0$ and $D^2X_0$, $D^2Y_0$ are first and second order increments, respectively, for X and Y values for calculating the segments of the curve. Accordingly, all that needs to be stored for a single curve are the X, Y values, first and second order increments, and a Y maximum, or Y stop value. Although the above analysis shows first and second order increments, it will be appreciated that third and higher order increments can also be provided, in case additional flexibility is needed. However, it has been found that for most practical purposes, second order equations are sufficient, and if greater flexibility is needed, a greater number of curves and a greater number of segments can be employed.

Figure 23:
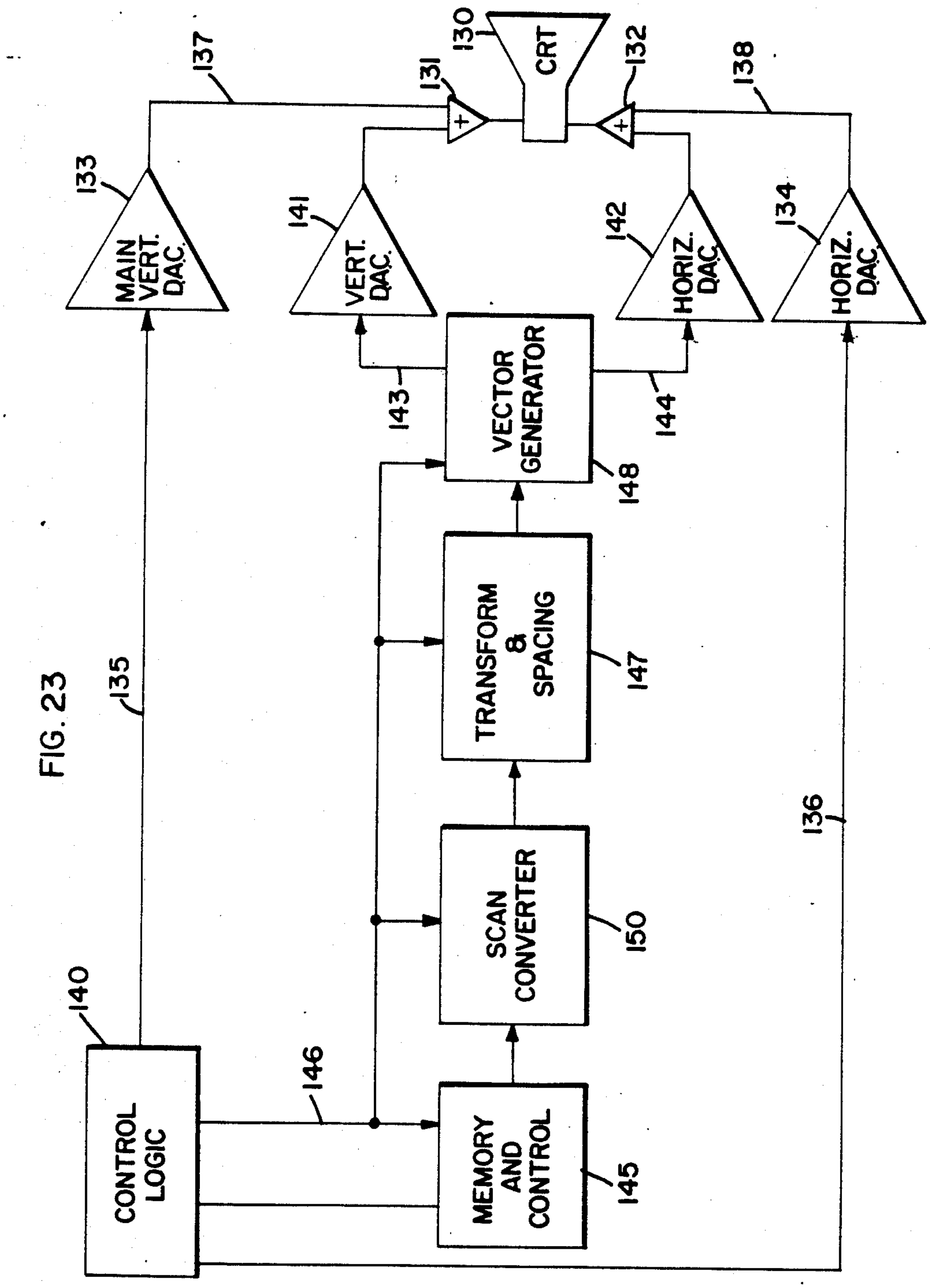
FIG. 23 is a block diagram of a graphic arts character generating system.

Referring now to FIG. 23, a graphic arts character generating system employing the present invention is shown in block diagram form. Reference numeral 130 indicates a high resolution cathode ray tube (CRT) which is used to form the finished image of the character, or in this case, group of characters. Summing amplifier 131 is provided for controlling the vertical deflection of CRT 130, and summing amplifier 132 controls horizontal deflection. The deflection amplifiers each receive signals from a pair of digital to analog converters, one for controlling position of the character on the face of the screen, and the other for controlling generation of the character itself. Specifically, reference numerals 133 and 134 are the main vertical, and main horizontal, respectively, digital to analog converters. They are operated via data lines 135 and 136, respectively, from main control logic unit 140. Converters 133 and 134 provide outputs on data lines 137 and 138, respectively, to inputs of summing amplifiers 131 and 132, respectively.

The generation of the characters themselves is controlled through vertical digital to analog converter 141 and horizontal digital to analog converter 142, whose outputs can act as summing inputs to amplifiers 131 and 132, respectively.

A memory, and memory control unit 145 is provided, and is connected for data communication with control logic 140 through data line 146. This memory contains the data sets for all the characters for one or more type fonts, plus any special or custom characters that may be used. It connects to scan converter 150, which is explained in greater detail below with reference to FIG. 24. Scan converter 150 in turn connects to a transformation and spacing computation section 147, which in turn connects to vector generator 148. All of these components are connected for control by logic 140. Vector generator 148 connects to outputs 143, 144 to the character digital to analog converters 141 and 142, respectively. Scan converter 150 generates the coordinates for creating the image of the character on the CRT 130, from the font data stored in memory 145. Section 147 operates from that data and calculates any rotation or scaling of the character as may be commanded by the logic. Vector generator 148 then calculates and generates the scan segments which are scanned on the face of CRT 130 to create the character.

Figure 24:
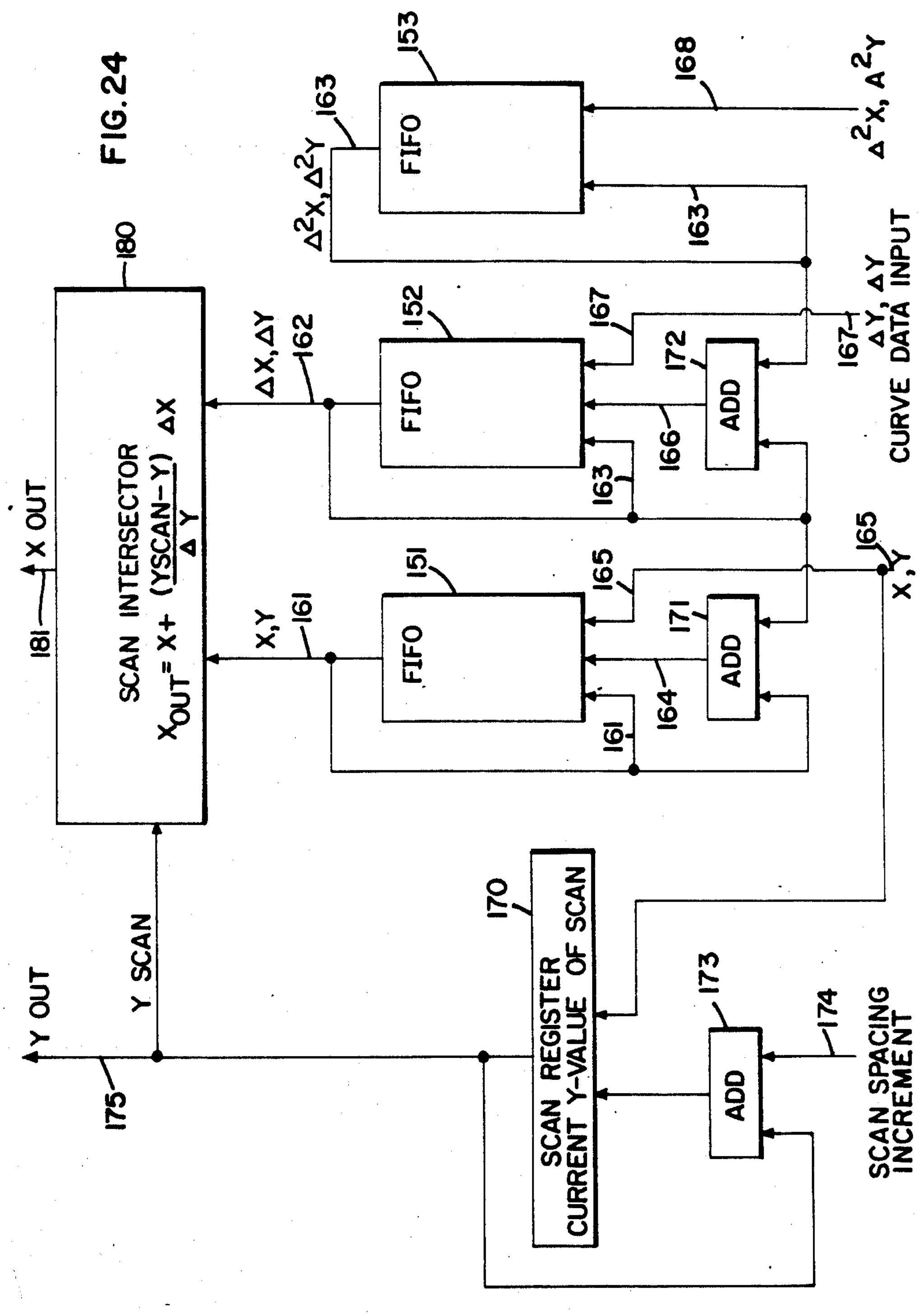
FIG. 24 is a block diagram of the scane converter of FIG. 23, for implementing the forward-difference data technique.

Referring now to FIG. 24, the scan converter is shown in greater detail. In FIG. 24, scan converter 150 includes, in the embodiment shown, three memories 151, 152, 153 for holding current curve data. Memory 151 holds X and Y values; memory 152 holds DX and DY values; and memory 153 holds $D^2$ X and $D^2$ Y values. This implementation is for the second order parametric equations as discussed above. If third or higher order terms are also used, additional memories would be provided. Memories 151–153 are operated principally as first in-first out memories (FIFO). Data are read out from FIFOs 151–153 on data lines 161–163, respectively. Data can be input to FIFO 151 through a branch of data line 161, through data line 164, or data line 165. Data can be input to FIFO 152 from a branch of data line 163, data line 166, or data line 167. The output from FIFO 153 is taken on data line 163, a branch of which connects back to an input thereof. The other data input for FIFO 153 is connected from data line 168.

A register 170 is provided, receiving an input from a branch of data line 165, and another input from Add circuit 173. Further Add circuits 171 and 172 are also provided. Add 177 has its output to data line 164, and receiving input from branches of data lines 151 and 162. Add 172 receives inputs from data lines 162 and 163, and provides an output on data line 166.

Reference 180 designates calculation circuitry which calculates the X value corresponding to the given Y scan value, from the equation given in FIG. 24. The operation of the circuitry of FIG. 4 is better understood with reference to FIGS. 25 and 26. FIG. 25 is an enlarged diagrammatic representation of a portion of the "g" figure of FIG. 21, showing the intersection of the scan lines with curves 108, 109, 110, and 106 in the central portion of the figure. In FIG. 25, curve 108 is shown as being composed of a plurality of straight line segments, segments **108*a* and 108*b* being shown. Similarly, curve 109 is made up of individual straight line segments, with segments 109*a* and 109*b* being shown. Segments 110*a* and 110*b* for curve 110 are also shown. Curve 106** is a vertical straight line and is not further segmented.

Also shown in FIG. 25 are three scan lines designated 200, 201 and 202. These scan lines processed in the X direction, from the left hand to the right hand side of the figure. Scans 201 and 202 represent successive incremental values of Y, but it will be appreciated that the spacing between them is exaggerated in FIG. 25 for purposes of illustration: they could be much closer together. Each of scan lines 200–202 are shown in full line within the character, i.e. corresponding to the portion of the character that would be filled in on the face of the CRT 130 and are shown in dotted line outside the character. The system of FIG. 24 calculates the intersections of each of the scan lines with the curves 108, 109, 110, 106 so that the vector generator 148 of FIG. 23 can draw in the character.

For purposes of illustration, assume that the character shown in FIG. 21 is being scanned on CRT 130 of the graphic arts character generator of FIG. 23. The characters are scanned from left to right and bottom to top. Assume that scanning has proceeded and that the next Y scan line would be 200 of FIG. 25. The value for this scan line is currently in register 170, the value having been incremented by adder 173 since the previous Y scan. FIFOs 151–153 contain, in consecutive order, the parameter values for the current segments of curves 108, 109, 110 and 106. Specifically, FIFO 151 holds, in consecutive order, the X and Y values for segment 108*a*, 109*a*, 110*a* and 106. In similar manner, FIFOs 152 and 153 hold the first and second order incremental values DX, DY, $D^2$ X and $D^2$ Y for those same segments. The current Y value from register 170 is applied to scan intersecter 180 via a branch of data line 175. The X, Y, DX and DY values for straight line segment 108*a* are also applied to scan intersector 180. Intersecter 180 then calculates the X coordinate of the intersection of scan line 200 with segment 108*a* and provides that X coordinate as an output at data line 181. This X intersection value, together with the current Y value on data line 175 is passed on for transformation and scaling, if needed, by block 147, and then to vector generator 148 of FIG. 23, where it will be used to turn on the electron beam at the proper point for filling in the character.

FIFOs 151–153 are then recycled, bringing the parameter values for segment 109*a* to the top. The intersection of Y scan 200 and line segment 109*a* is then calculated, as this X value is likewise passed on. The process is then repeated for calculating the intersections of scan line 200 with segments 110*a* and 106. Based upon these intersection points, the vector generator 148 can fill in the scan line at the proper position to fill in that portion of the character. The scan line is then retraced, the scan spacing increment (which is ordinarily one line) is added to the prior value by Add 173 so that scan register 170 is incremented to prepare for scan line 201. The intersection of scan line 201 with curve segment 108*a* is then calculated in the same manner as described above. Simultaneously, a calculation is made that shows that scan line 201 is the uppermost scan line for segment 108*a*, indicating that for the next succeeding scan line, segment 108*b* will be current. Therefore, parameters for segment 108*b* will be needed on the next scan, and they are introduced into the FIFOs in the proper sequence for curve 108 data as follows. The new X, Y values are the old X, Y values plus DX, DY. Add 171 adds the DX, DY values from FIFO 152 to the prior X, Y values from FIFO 151 and reintroduces them in FIFO 151. At the same time, new DX, DY values are calculated by adding the old values to the $D^2$ X, $D^2$ Y values in Add 172 and introducing them in FIFO 152. The $D^2$ X, $D^2$ Y values are always recirculated in FIFO 153 (for this second order embodiment). This completes the updating of curve data for curve 108. The system then calculates the intersection of scan line 201 with curves 109*a*, 110*a* and 106 as previously described, and this portion of the character is all filled in.

At the completion of that scan, the scan is retracted, register 170 is incremented, and the system is ready to scan line 202. Because of the updating done previously, the FIFOs now contain parameters for segment 108*b*, and they are used to calculate the intersection of curve 108 with scan line 202.

Scanning proceeds in the manner indicated above, and as the top is reached of individual scan segments 109*a*, 110*a*, 108*b*, 109*b*, 110*b*, etc., the parameter values in the FIFOs are updated as described above so that the current line segments for the current curves are always available for calculation of scan intersection points.

FIFOs 151–153 should have capacity for sufficient pairs of curve data expected to be encountered. Curve data will always be in pairs, unless it is desired to fill a character from a curve boundary out to the right hand edge of the scanning field. For portions of many letters, a single pair of curved data will be present in the FIFOs. For the portion of the character "g" shown, two pairs of curved data are current: for a "w", four pairs would be needed for the middle portion of the letter. As scanning of a letter transitions from one curve to an adjacent curve, new curve data are input at data lines 165, 167, 168 and the scan intersection calculations continue with the new curve or curves.

Figure 26:
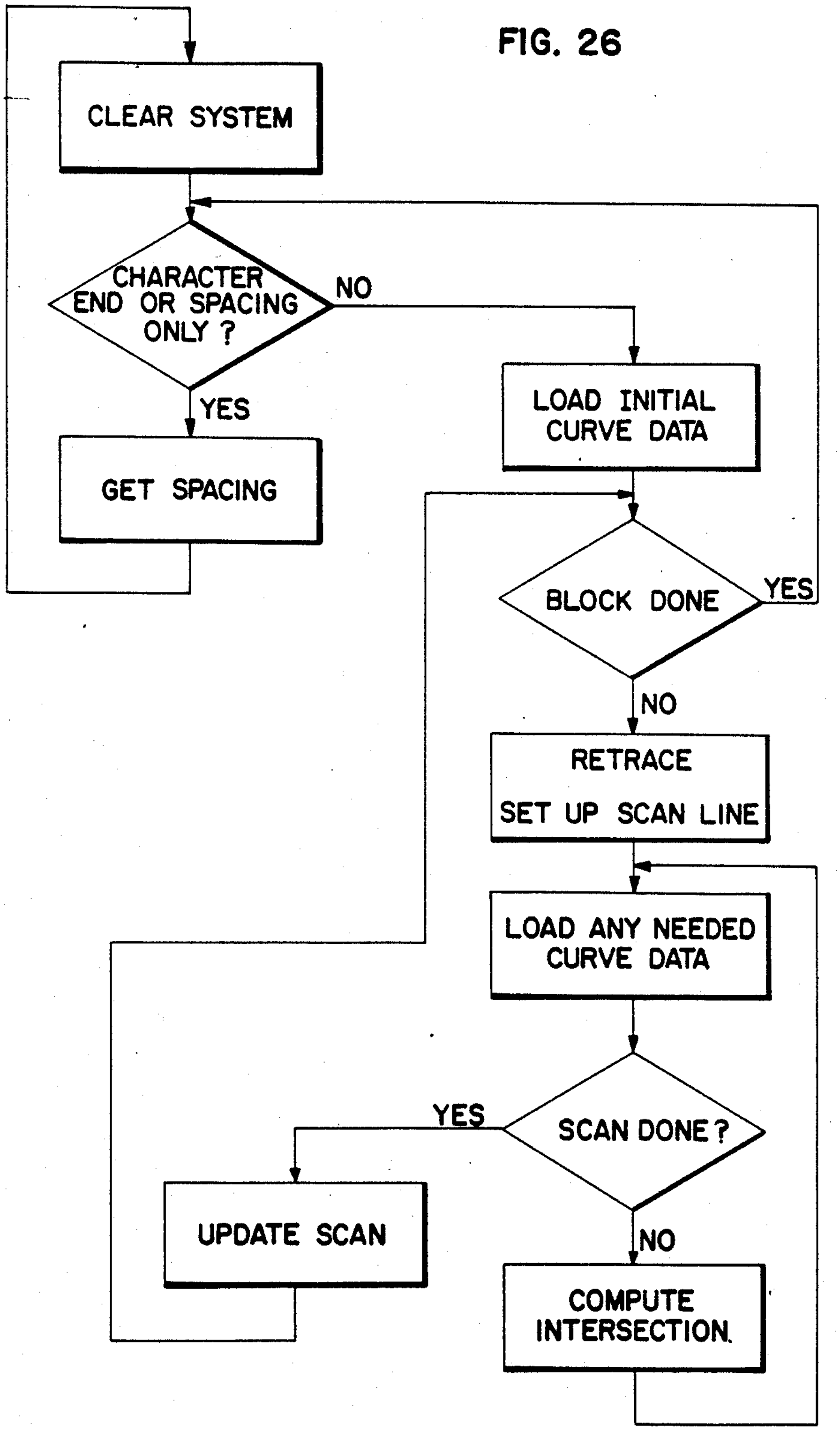
FIG. 26 is a flow chart summarizing the operation of the system of FIGS. 23 and 24.

The overall system operation is summarized in FIG. 26. After clearing the system, a decision is made whether a character is to be created or whether only spacing between characters is involved. If a character is to be generated, the initial curve data for the lowermost curved pair of pairs of the character are loaded from font memory into scan converter 153. Characters such as "i" are referred to as having two blocks, i.e. the main letter and the dot which are not continuous, and these are accomplished by first tracing out one "block", and when that is done, loading the curve and spacing data for the second block. The scan is retracted to the left boundary of the plotting area (the overall positioning of the character on the face of the CRT 130 having previously been established by logic 140 and main digital converters 133, 134). The scan is then done by successively calculating intersection points for each current curve in the FIFO memories, loading any additional curve data that is needed when a transition is made from one curve to an adjoining curve. After all intersections have been calculated for the particular scan, the scan register is updated, end of block, or end of character are tested and the cycle repeats if necessary until the entire character is scanned.

The above method using forward-difference data and the implementation shown is preferred for high speed recreation of characters from a plurality of fonts that may be stored in memory by minimum data sets consisting of forward-difference data for the curves that make up the Bezier figure figure.

It should be understood that even though the above described numerous characteristics and advantages of the invention have been set forth in the foregoing description, together with details of the structure and function of the invention, the disclosure is illustrative only, and changes may be made in detail, especially in matters of shape, size and arrangement of parts, within the principle of the invention, to the full extent indicated by the broad general meaning of the terms in which the appended claims are expressed.

What is claimed is:

1. In a computer aided or generated graphics system, a method of graphical representation of a arbitrary two dimensional shape, comprising the steps of;

providing a set of data points representing the periphery of the shape;

converting said periphery data point set to second sets of data for second or higher order parametric equations which define a plurality of adjoining curves that closely approximate said shape; and recreating said shape from said second sets of data for presentation on a display medium.

2. In a computer aided or generated graphics system, a method of creating a data set representative of an arbitrary two dimensional shape for subsequent graphic arts presentation of said shape, comprising;

providing a data set set representative of a boundary of said shape;

analyzing said boundary data set to identify as node points the maximum value, minimum value, starting, ending and inflection points of said shape; and establishing control points for adjacent pairs of node points, said control points and said node points defining second or higher order parametric curves interconnecting said node points to closely approximate the boundary of said shape.

3. In a computer aided or generated graphics system, a method of graphical representation of an arbitrary two dimensional shape, comprising the steps of;

providing sets of data for adjoining second or higher order parametric curves which closely approximate said shape;

converting the sets of data for said curves to sets of data for a plurality of straight line segments defining a polygon closely approximating said curves; and presenting said shape on a scanned display medium by repetitively calculating positions of scanned line intersections with said plurality of straight line segments.

4. In a computer aided or generated graphics system, a method of graphical representation of an arbitrary two dimensional shape, comprising the steps of;

providing sets of data for adjoining second or higher order parametric curves which closely approximate said shape;

converting the sets of data for said curves to sets of forward-difference data for a plurality of stright line segments closely approximating said curves; and presenting said shape on a scanned display medium by repetitively calculating positions of scanned line intersections with said plurality of straight line segments.

5. In a computer aided or generated graphics system, a method for graphical representation of an arbitrary two dimensional figure, comprising;

providing a first data set representative of the outer boundary of said figure;

converting said first data set to a second data set representative of the outer boundary of a shape closely resembling that of said figure, said shape being defined by a plurality of adjoined second or higher order parametric curves;

expanding said second data set to a third data set representative of a polygon having a sufficient number of vertices to closely approximate said shape; and presenting said polygon represented by said third data set via a display medium to create an image thereon closely approximating that of said figure.

6. A method in accordance with claim 1, wherein the step of recreating said shape from said second sets of data for presentation on a display medium includes the step of converting said second sets of data to sets of data for a plurality of adjoining straight line segments closely approximating said curves defined by the second sets of data and further includes the step of presenting said shape on a scanned display medium by repetitively calculating positions of scanned line intersections with said plurality of straight line segments.

7. A method in accordance with claim 6, where said step of converting said second sets of data to sets of data for a plurality of adjoining straight line segments includes the step of converting said second sets of data to sets of forward-difference data for a plurality of adjoining straight line segments closely approximating said curves defined by said second sets of data.

8. A method in accordance with claim 7, wherein said step of converting said second sets of data to forward-difference data for a plurality of straight line segments includes the steps of adding to the present coordinates first order of increment and adding to the first order of increment a second order of increment.

9. A method in accordance with claim 1, wherein the step of converting said periphery data point set to second sets of data for second or higher order parametric equations which define a plurality of adjoining curves that closely approximate said shape invludes the steps of analyzing said set of data points representing the periphery of the shape to identify as node points the maximum value, minimum value, starting, ending and inflection points of said shape, and the step of establishing control points for adjacent pairs of node points, the control points and the node points defining second or higher order parametric curves interconnecting the node points to closely approximate the boundary of the shape.

10. A method in accordance with claim 9, wherein the step of establishing control points for adjacent pairs of node points includes defining control lines through each of the node points of the adjacent pairs of node points, the control lines being parallel to lines through the data points on either side of the respective node points through which the control lines extend, the control points being defined by the intersection of the control lines of the adjacent pairs of node points.

11. A method in accordance with claim 10, wherein the plurality of adjoining curves comprise Bezier curves.

12. A method in accordance with claim 11, wherein the Bezier curves are defined by the following parametric equations:

$$X=P_0+P_1Z+P_2Z^2$$

$$Y=Q_0+Q_1Z+Q_2Z^2$$

where: Z varies from 0 to 1 and where $P_0$, $P_1$, $P_2$, $Q_0$, $Q_1$ and $Q_2$ are defined as follows:

$$P_0=X(i)$$

$$P_1=2[Xc(i)-X(i)]$$

$$P_2=X(i)-2Xc(i)+X(i+1)$$

$$Q_0=Y(i)$$

$$Q_1=2[Yc(i)-Y(i)]$$

$$Q_2=Y(i)-2Yc(i)+Y(i+1)$$

Xc(i), Yc(i) are control point coordinates between adjacent nodes whose coordinates are X(i), Y(i), and X(i+1), Y(i+1).

13. A method in accordance with claim 5, wherein the step of expanding said second data set to a third data set includes the step of measuring a distance E between a point C lying on one of the second or higher order parametric curves between two adjacent vertices and a point L lying on a polygon line segment between the vertices and selecting a maximum value for the distance E whereby the number of straight line segments required for a given parametric curve may be determined by the following equation:

$$1/Z_I = \frac{(P_2^2 + Q_2^2)^{\frac{1}{4}}}{2\sqrt{E}}$$

wherein $Z_I$ equals increment in parameter Z between 0 and 1.

14. In a computer aided or generated graphics system, a method of graphical representation of an arbitrary two dimensional shape, comprising the steps of;

providing a set of data points representing the periphery of the shape;

converting said periphery data point set to second sets of coordinate data for second or higher order parametric equations which define a plurality of adjoining curves that closely approximate the shape, including the steps of analyzing said set of data points representing the periphery of the shape to identify as node points the maximum value, minimum value, starting, ending and inflection points of said shape, and the step of establishing control points for adjacent pairs of node points, the control points and the node points defining second or higher order parametric curves interconnecting the node points to closely approximate the boundary of the shape; and recreating said shape from said second sets of data for presentation on a display medium, including the step of converting said second sets of data to sets of data for a plurality of adjoining straight line segments closely approximating said curves.

15. In a computer aided or generated graphics system, an apparatus for graphical representation of arbitrary two dimensional shapes, comprising:

means for providing a set of data points representing the periphery of the shape;

means for converting said periphery data point set to second sets of data for second or higher order parametric equations which define a plurality of adjoining curves that closely approximate the shape; and means for recreating the shape from the second sets of data for presentation on a display medium.

16. An apparatus in accordance with claim 15, wherein the means for converting said periphery data point set includes means for analyzing said periphery data point set to identify as node points the maximum value, minimum value, starting, ending and inflection points of the shape and means for establishing control points for adjacent pairs of node points, the control points and the node points defining second or higher order parametric curves interconnecting the node points to closely approximate the boundary of the shape.

17. An apparatus in accordance with claim 16, wherein the means for establishing control points includes means for defining control lines through each of the node points of the adjacent pairs of node points, the control lines being parallel to lines through the data points on either side of the respective node points through which the control lines extend, the control points being defined by the intersection of the control lines of the adjacent pairs of node points.

18. An apparatus in accordance with claim 15, wherein the second sets of data define the following parametric equations:

$$X = P_0 + P_1 Z + P_2 Z^2$$

$$Y = Q_0 + Q_1 Z + Q_2 Z^2$$

where: Z varies from 0 to 1 and where $P_0$, $P_1$, $P_2$, $Q_0$, $Q_1$ and $Q_2$ are defined as follows:

$$P_0 = X(i)$$

$$P_1 = 2[Xc(i) - X(i)]$$

$$P_2 = X(i) - 2Xc(i) + X(i+1)$$

$$Q_0 - Y(i)$$

$$Q_1 = 2[Yc(i) - Y(i)]$$

$$Q_2 = Y(i) - 2Yc(i) + Y(i+1)$$

Xc(i), Yc(i) are control point coordinates between adjacent nodes whose coordinates are X(i), Y(i), and X(i+1), Y(i+1).

19. An apparatus in accordance with claim 17, wherein the second sets of data define the following parametric equations:

$$X = P_0 + P_1 Z + P_2 Z^2$$

$$Y = Q_0 + Q_1 Z + Q_2 Z^2$$

where: Z varies from 0 to 1 and where $P_0$, $P_1$, $P_2$, $Q_0$, $Q_1$ and $Q_2$ are defined as follows:

$$P_0 = X(i)$$

$$P_1 = 2[Xc(i) - X(i)]$$

$$P_2 = X(i) - 2Xc(i) + X(i+1)$$

$$Q_0 = Y(i)$$

$$Q_1 = 2[Yc(i) - Y(i)]$$

$$Q_2 = Y(i) - 2Yc(i) + Y(i+1)$$

Xc(i), Yc(i) are control point coordinates between adjacent nodes whose coordinates are X(i), Y(i), and X(i+1), Y(i+1).

* * * * *

UNITED STATES PATENT AND TRADEMARK OFFICE

CERTIFICATE OF CORRECTION

PATENT NO. : 4,674,058

DATED : June 16, 1987

INVENTOR(S) : Lindbloom et al.

It is certified that error appears in the above-identified patent and that said Letters Patent is hereby corrected as shown below:

Title Page, Other Publications, Line 9, "APS-MICRO 5 Digital CTR" should be --APS-MICRO 5 Digital CRT--.
Title Page, Line 6 of Abstract, "an" should be --as--.
Column 2, Line 41, "itsadvantages" should be --its advantages--.
Column 2, Line 42, "obtained its use" should be --obtained by its use--.
Column 3, Line 27, "scane" should be --scan--.
Column 3, Line 52, "vartices" should be --vertices--.
Column 5, Line 21, "figures" should be --figure--.
Column 7, Line 37, "$\simeq$" should be --$\eqsim$--.
Column 7, Line 44, "segment" should be --segments--.
Column 8, Line 22, "of" should be --or--.
Column 9, Line 2, "the" should be --be--.
Column 10, Line 33, "figure figure" should be --figure--.
Column 10, Line 62, "segmated" should be --segmented--.
Column 12, Line 50, "processed" should be --proceed--.
Column 13, Line 14, "intersector" should be --intersecter--.
Column 13, Line 56, "retracted" should be --retraced--.
Column 14, Line 25, "retracted" should be --retraced--.
Column 14, Line 43, delete first occurrence of "figure".
Column 14, Line 56, "representation of a" should be --representation of an--.
Column 15, Line 3, delete first occurrence of "set".
Column 15, Line 34, "stright" should be --straight--.
Column 16, Line 18, "invludes" should be --includes--.

Signed and Sealed this

Seventeenth Day of January, 1989

*Attest:*

DONALD J. QUIGG

*Attesting Officer* *Commissioner of Patents and Trademarks*